United States Patent
Mitsuta et al.

(10) Patent No.: US 9,012,105 B2
(45) Date of Patent: Apr. 21, 2015

(54) MEMBRANE ELECTRODE ASSEMBLY FOR FUEL CELL

(71) Applicant: Honda Motor Co., Ltd., Tokyo (JP)

(72) Inventors: Naoki Mitsuta, Wako (JP); Hiroshi Sohma, Wako (JP); Yukihito Tanaka, Wako (JP); Yusuke Okabe, Wako (JP); Yu Tomana, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 13/932,011

(22) Filed: Jul. 1, 2013

(65) Prior Publication Data

US 2014/0011111 A1  Jan. 9, 2014

(30) Foreign Application Priority Data

Jul. 3, 2012  (JP) ................................. 2012-148995

(51) Int. Cl.
  *H01M 8/02* (2006.01)
  *H01M 8/10* (2006.01)

(52) U.S. Cl.
  CPC ............ *H01M 8/0273* (2013.01); *Y02E 60/521* (2013.01); *H01M 8/1002* (2013.01); *H01M 2008/1095* (2013.01)

(58) Field of Classification Search
  CPC ............ H01M 8/0273; H01M 8/1002; H01M 2008/1095
  USPC ........................................................ 429/481
  See application file for complete search history.

(56) References Cited

U.S. PATENT DOCUMENTS

| | | | |
|---|---|---|---|
| 7,005,208 B2 | 2/2006 | Suenaga et al. | |
| 8,911,916 B2 * | 12/2014 | Sugiura et al. | 429/483 |
| 8,968,957 * | 3/2015 | Goto et al. | 429/463 |
| 2005/0014056 A1 | 1/2005 | Zuber et al. | |
| 2010/0047649 A1 | 2/2010 | Yamada et al. | |
| 2011/0136038 A1 * | 6/2011 | Ishida et al. | 429/480 |
| 2012/0219874 A1 | 8/2012 | Suzuki et al. | |
| 2012/0321980 A1 * | 12/2012 | Goto et al. | 429/463 |
| 2013/0101916 A1 * | 4/2013 | Sugiura et al. | 429/480 |
| 2014/0004442 A1 * | 1/2014 | Mitsuta et al. | 429/481 |

FOREIGN PATENT DOCUMENTS

| | | |
|---|---|---|
| JP | 2007-066766 | 3/2007 |
| JP | 2009-181951 | 8/2009 |
| JP | 2013-033650 | 2/2013 |
| JP | 2013-98155 | 5/2013 |

* cited by examiner

*Primary Examiner* — Stewart Fraser
(74) *Attorney, Agent, or Firm* — Mori & Ward, LLP

(57) ABSTRACT

A membrane electrode assembly for a fuel cell includes a membrane electrode assembly and a resin frame member. The membrane electrode assembly includes a solid polymer electrolyte membrane, a first electrode, and a second electrode. The first electrode includes a first catalyst layer and a first gas diffusion layer. The second electrode includes a second catalyst layer and a second gas diffusion layer. The resin frame member includes an outer peripheral portion and an inner peripheral projection. A first space includes a gap between an outer peripheral end face of the second gas diffusion layer and an inner-side end face of the inner peripheral projection. A second space includes a gap between an outer peripheral end face of the first gas diffusion layer and an inner-side wall face of the outer peripheral portion. The first space has a dimension different from a dimension of the second space.

5 Claims, 5 Drawing Sheets

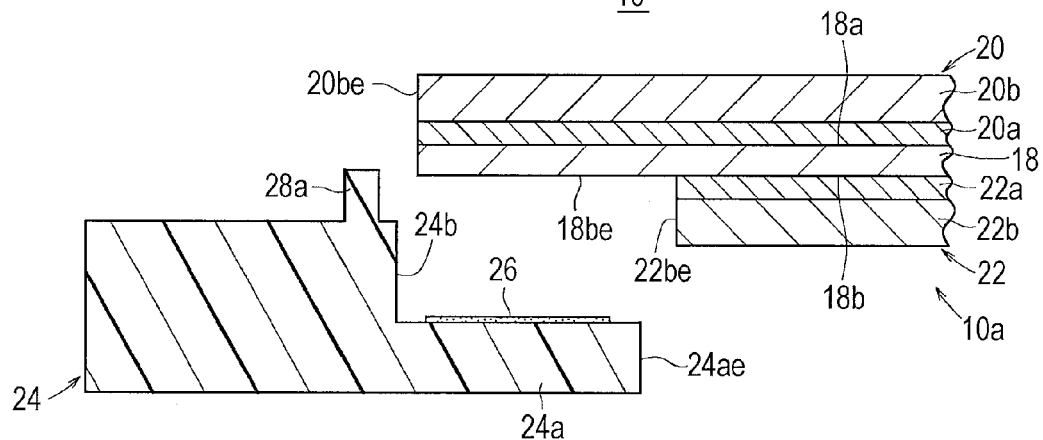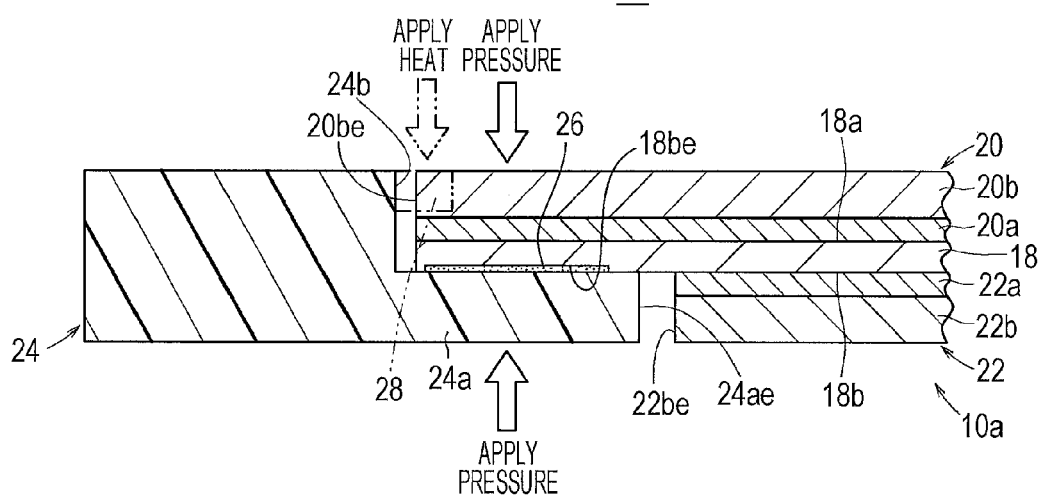

MEMBRANE ELECTRODE ASSEMBLY FOR FUEL CELL

CROSS-REFERENCE TO RELATED APPLICATIONS

The present application claims priority under 35 U.S.C. §119 to Japanese Patent Application No. 2012-148995, filed Jul. 3, 2012, entitled "Membrane Electrode Assembly with Resin Frame for Fuel Cell." The contents of this application are incorporated herein by reference in their entirety.

BACKGROUND OF THE INVENTION

Field of the Invention

The present disclosure relates to a membrane electrode assembly for a fuel cell.

Discussion of the Background

In general, a solid polymer electrolyte fuel cell employs a solid polymer electrolyte membrane including a polymer ion exchange membrane. The fuel cell includes a membrane electrode assembly (MEA) and separators (bipolar plates) between which the MEA is sandwiched, the MEA having a solid polymer electrolyte membrane, an anode electrode, and a cathode electrode, the anode electrode and the cathode electrode being disposed on respective sides of the solid polymer electrolyte membrane and including a catalyst layer (electrode catalyst layer) and a gas diffusion layer (porous carbon). A predetermined number of the fuel cells constitute a fuel cell stack which is used, for example, as an in-vehicle fuel cell stack.

In some cases, this type of MEA forms what is called a stepped MEA, in which one gas diffusion layer is set to have a surface area smaller than the surface area of the solid polymer electrolyte membrane, and the other gas diffusion layer is set to have a surface area equal to the surface area of the solid polymer electrolyte membrane. In those cases, a MEA with an incorporated resin frame member is used in order to reduce the amount of relatively expensive solid polymer electrolyte membrane to be used, and to protect the thin film-shaped solid polymer electrolyte membrane having a low intensity.

For example, there is known the membrane electrode assembly disclosed in Japanese Unexamined Patent Application Publication No. 2007-66766. In the membrane electrode assembly, as illustrated in FIG. 7, an anode catalyst layer $2a$ and an anode diffusion layer $2b$ are disposed on one side of a membrane 1, and a cathode catalyst layer $3a$ and a cathode diffusion layer $3b$ are disposed on the other side of the membrane 1, thereby forming a stepped MEA 4.

The anode diffusion layer $2b$ is set to have an area larger than the area of the cathode diffusion layer $3b$, and the outer peripheral portion of the membrane 1 of the cathode diffusion layer $3b$ and a gasket assembly 5 are connected via an adhesive layer 6.

In the Japanese Unexamined Patent Application Publication No. 2007-66766 mentioned above, the gasket assembly 5 includes a thin-walled portion $5b$ adjacent to a step inner face $5a$. The outer peripheral area of the anode diffusion layer $2b$ is disposed opposed to the step inner face $5a$, and the outer peripheral area of the cathode diffusion layer $3b$ is disposed opposed to an inner end face $5bb$ of the thin-walled portion $5b$.

SUMMARY OF THE INVENTION

According to one aspect of the present invention, a membrane electrode assembly for a fuel cell includes a membrane electrode assembly and a resin frame member. The membrane electrode assembly includes a solid polymer electrolyte membrane, a first electrode, and a second electrode. The first electrode is disposed on one surface of the solid polymer electrolyte membrane and includes a first catalyst layer and a first gas diffusion layer. The second electrode is disposed on another surface of the solid polymer electrolyte membrane and includes a second catalyst layer and a second gas diffusion layer. A planar dimension of the first gas diffusion layer is larger than a planar dimension of the second gas diffusion layer. The resin frame member is to surround an outer periphery of the solid polymer electrolyte membrane. The resin frame member includes an outer peripheral portion and an inner peripheral projection. The inner peripheral projection is thinner than the outer peripheral portion and projects toward the second gas diffusion layer from the outer peripheral portion. A step is defined by the outer peripheral portion and the inner peripheral projection. The outer peripheral portion includes an inner-side wall face which is included in the step. The inner-side wall face faces an outer peripheral end face of the first gas diffusion layer. A first space includes a gap between an outer peripheral end face of the second gas diffusion layer and an inner-side end face of the inner peripheral projection. A second space includes a gap between the outer peripheral end face of the first gas diffusion layer and the inner-side wall face. The first space has a dimension different from a dimension of the second space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 illustrates a step of manufacturing the membrane electrode assembly with a resin frame.

FIG. 6 illustrates a step of manufacturing the membrane electrode assembly with a resin frame.

DESCRIPTION OF THE EMBODIMENTS

Figure 1:
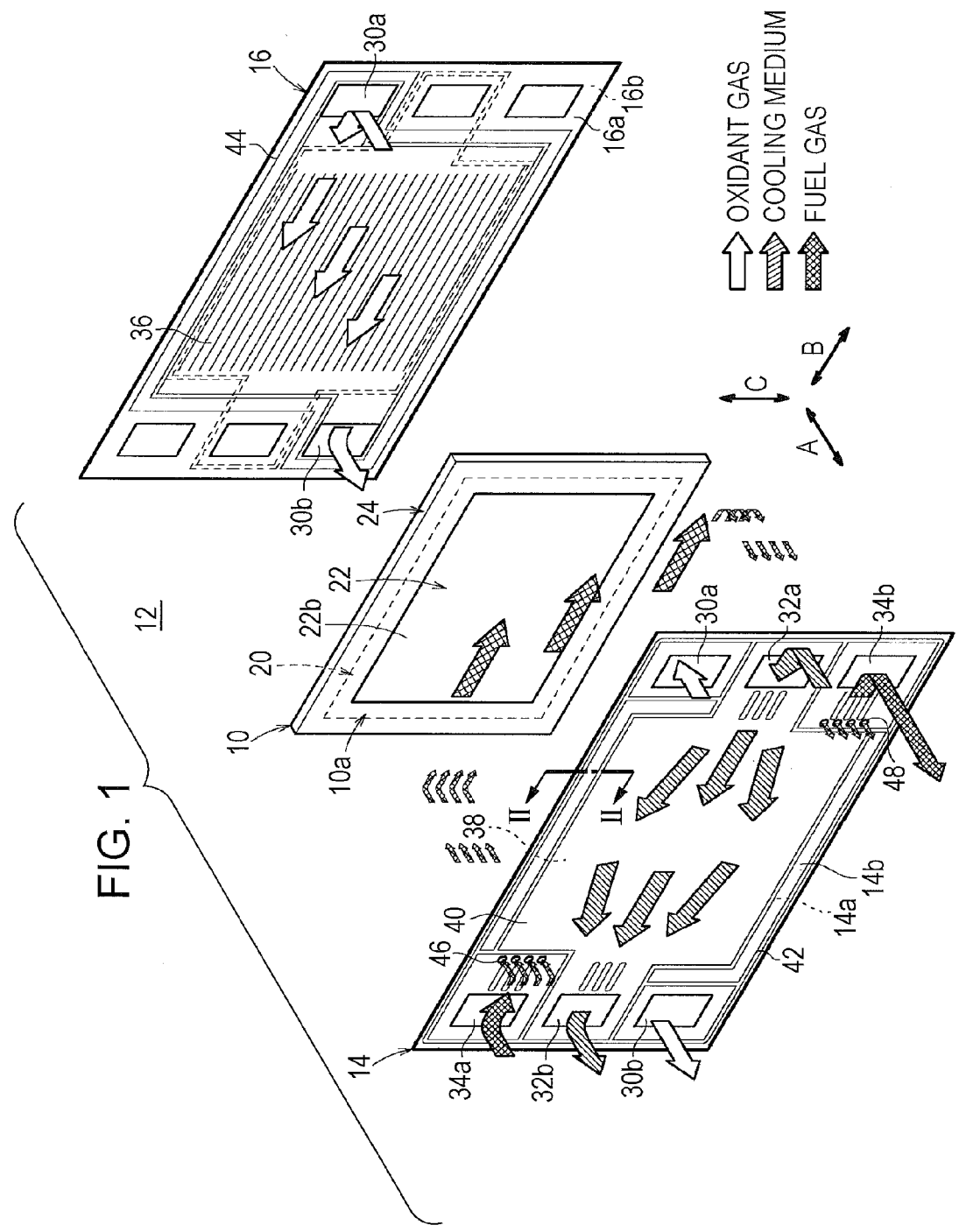
FIG. 1 is an exploded perspective view of the main part of a solid polymer electrolyte fuel cell with an incorporated membrane electrode assembly with a resin frame according to an embodiment of the present disclosure.

The embodiments will now be described with reference to the accompanying drawings, wherein like reference numerals designate corresponding or identical elements throughout the various drawings.

Figure 2:
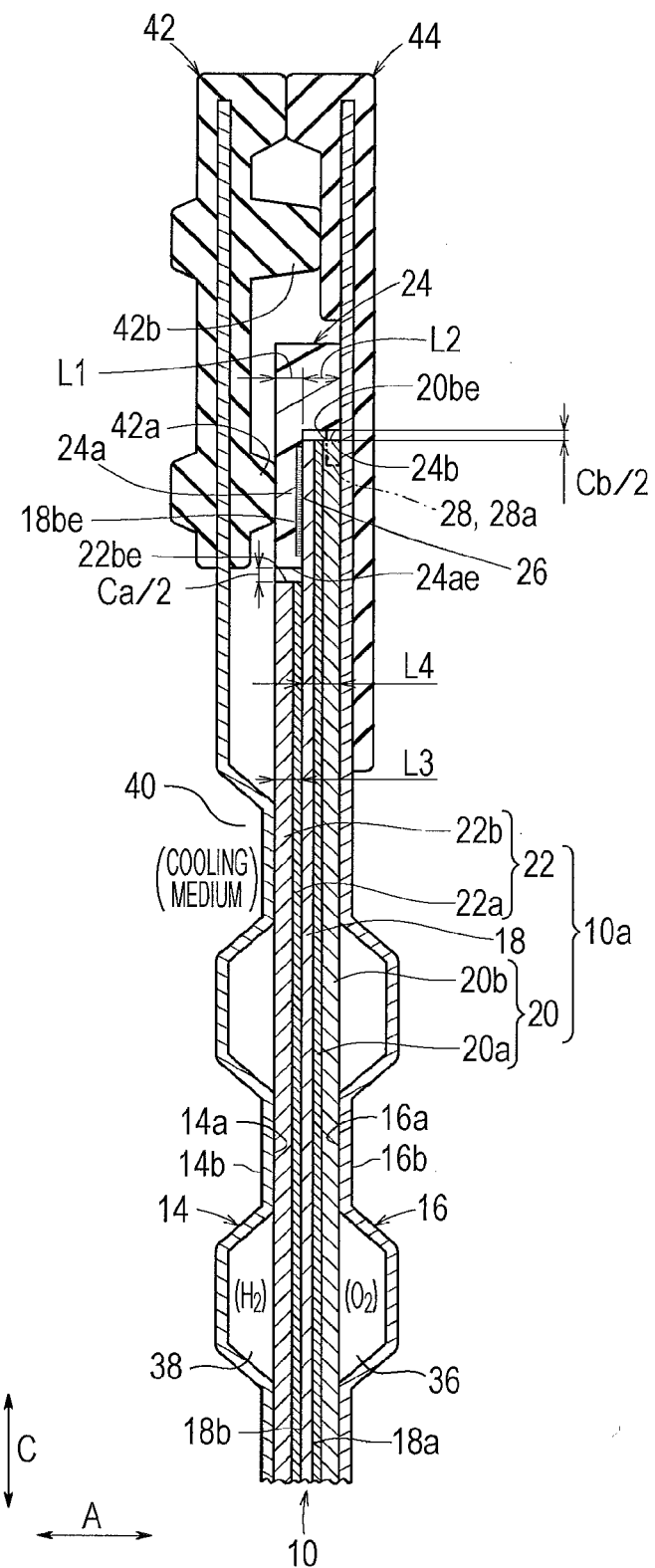
FIG. 2 is a cross-sectional view of the fuel cell taken along the line II-II in FIG. 1.

As illustrated in FIGS. 1 and 2, a membrane electrode assembly 10 with a resin frame according to an embodiment of the present disclosure is incorporated in a solid polymer electrolyte fuel cell 12. A plurality of the fuel cells 12 are stacked in the direction of arrow A (for example, horizontal direction), and thus forms, for example, an in-vehicle fuel cell stack.

In the fuel cell 12, the membrane electrode assembly 10 is sandwiched between a first separator 14 and a second separator 16. The first separator 14 and the second separator 16 are made of, for example, steel plate, stainless steel plate, aluminum plate, plated steel plate, carbon member, or metal plate having a surface on which corrosion protective treatment has been performed.

As illustrated in FIG. 2, the membrane electrode assembly with a resin frame 10 includes a membrane electrode assembly 10a. The membrane electrode assembly 10a has a solid polymer electrolyte membrane 18 which is, for example, a thin perfluoro sulfonic acid membrane impregnated with water, and a cathode electrode (first electrode) 20 and an anode electrode (second electrode) 22 between which the solid polymer electrolyte membrane 18 is sandwiched. HC (hydrocarbon)-based electrolyte in addition to fluorine-based electrolyte is used as the material for the solid polymer electrolyte membrane 18.

The anode electrode 22 has a planar dimension (surface area) smaller than the planar dimension of the solid polymer electrolyte membrane 18 and the cathode electrode 20. The cathode electrode 20 may have a planar dimension (surface area) smaller than the planar dimension of the anode electrode 22.

The cathode electrode 20 is disposed on one surface 18a of the solid polymer electrolyte membrane 18, and the anode electrode 22 is disposed on the other surface 18b of the solid polymer electrolyte membrane 18.

The cathode electrode 20 has a first electrode catalyst layer (first catalyst layer) 20a attached to the surface 18a of the solid polymer electrolyte membrane 18, and a first gas diffusion layer 20b disposed on the first electrode catalyst layer 20a. The first electrode catalyst layer 20a and the first gas diffusion layer 20b are configured to have the same planar dimension.

The anode electrode 22 has a second electrode catalyst layer (second catalyst layer) 22a attached to the surface 18b of the solid polymer electrolyte membrane 18, and a second gas diffusion layer 22b disposed on the second electrode catalyst layer 22a. The second electrode catalyst layer 22a and the second gas diffusion layer 22b are configured to have the same planar dimension. The first electrode catalyst layer 20a has a planar dimension larger than the planar dimension of the second electrode catalyst layer 22a, however, the first electrode catalyst layer 20a and the second electrode catalyst layer 22a may be configured to have the same planar dimension.

The first electrode catalyst layer 20a and the second electrode catalyst layer 22a are formed by printing, applying or transferring catalyst paste on the both surfaces 18a, 18b of the solid polymer electrolyte membrane 18, the catalyst paste being produced by mixing catalyst particles in a solution of a polymer electrolyte, the catalyst particles being carbon black particles carrying platinum alloy, the polymer electrolyte serving as an ion conductive binder.

The first gas diffusion layer 20b and the second gas diffusion layer 22b are formed by applying a base layer to a sheet of carbon paper, the base layer containing carbon black and PTFE (polytetrafluoroethylene) particles. The base layer is configured to have the same planar dimension as the carbon paper. The base layer may be provided as necessary. The first gas diffusion layer 20b is configured to have larger planar dimension than that of the second gas diffusion layer 22b.

As illustrated in FIGS. 1 and 2, the membrane electrode assembly with a resin frame 10 includes a resin frame member 24 which surrounds the outer periphery of the solid polymer electrolyte membrane 18, and to be connected to the anode electrode 22 and the cathode electrode 20. The resin frame member 24 is formed by using a material such as PPS (polyphenylene sulfide), PP (polypropylene), PPA (polyphthalamide), PEN (polyethylenenaphthalate), PES (polyether sulfone), LCP (liquid crystal polymer), PVDF (polyvinylidene fluoride), a silicone rubber, a fluoride rubber, or an EPDM (ethylene propylene rubber), or a compound material of these, for example.

The resin frame member 24 has a frame shape and includes an inner peripheral projection 24a which is formed to be thinner than the outer peripheral portion via a step, projecting to the outer peripheral of the anode electrode 22, and being in contact with an outer peripheral edge 18be of the solid polymer electrolyte membrane 18. The base end of the inner peripheral projection 24a is provided with an inner-side wall face 24b which is included in the step and faces an outer peripheral end face 20be of the first gas diffusion layer 20b.

A wall thickness (thickness) L1 of the inner peripheral projection 24a has a dimension equal to or less than a thickness L3 of the anode electrode 22 (L1≤L3). The thickness L3 of the anode electrode 22 may include a thickness of multilayer structures such as intermediate layers which are not illustrated. The total thickness L4 of the solid polymer electrolyte membrane 18 and the cathode electrode 20 is set to have a dimension greater than or equal to a thickness L2 (the dimension obtained by subtracting the thickness L1 of the inner peripheral projection 24a from the thickness of the entire resin frame member 24) of the step portion of the resin frame member 24 (L2≤L4). The thickness L4 may include a thickness of multilayer structures such as having intermediate layers which are not illustrated.

The inner peripheral projection 24a of the resin frame member 24 and the outer peripheral end 18be of the solid polymer electrolyte membrane 18 are bonded together by an adhesive layer 26. For example, a silicone-based resin or a hot melt adhesive is used in the adhesive layer 26. The resin frame member 24 and the first gas diffusion layer 20b of the cathode electrode 20 are integrated by a resin impregnated part 28.

The resin impregnated part 28 includes a resin projection 28a which is integrally formed with the resin frame member 24. The resin impregnated part 28 is formed in a frame shape surrounding the entire periphery of the first gas diffusion layer 20b included in the cathode electrode 20.

Figure 3:
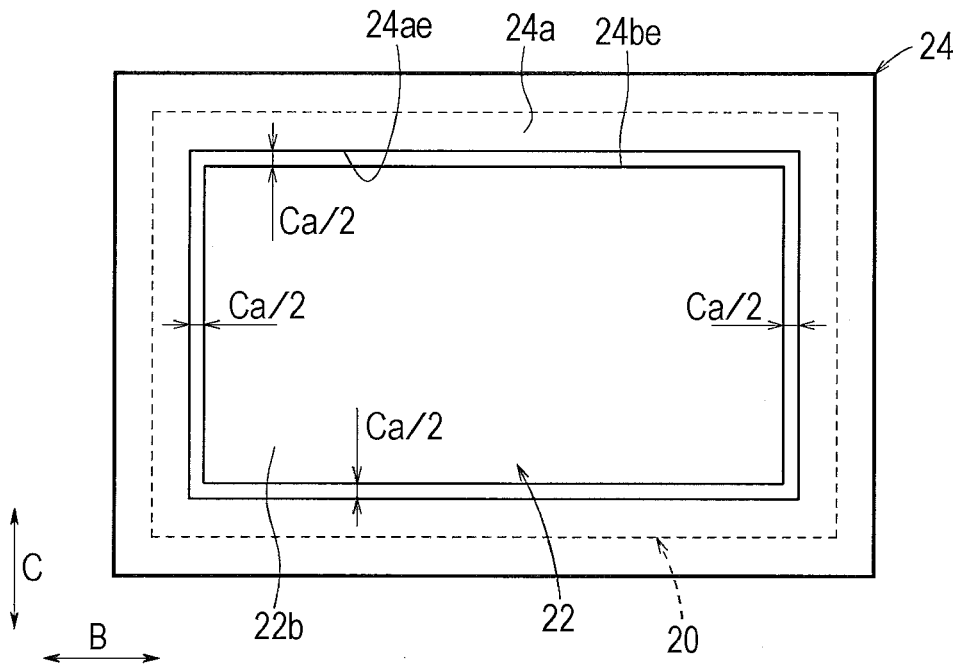
FIG. 3 is a front view of the anode electrode of the membrane electrode assembly with a resin frame.

As illustrated in FIG. 3, a first space Ca as a gap is provided between an outer peripheral end face 22be of the second gas diffusion layer 22b and an inner-side end face 24ae of the inner peripheral projection 24a along the entire periphery. The difference between the dimensions of the outer peripheral end face 22be in the longer length direction and the dimension of the inner-side end face 24ae in the longer length direction is the first space Ca. The difference between the dimension of the outer peripheral end face 22be in the shorter length direction and the dimension of the inner-side end face 24ae in the shorter length direction is the first space Ca. FIG. 3 illustrates an arrangement in which each side of the outer peripheral end face 22be is eaually away from a corresponding side of the inner-side end face 24ae by the first space Ca/2.

Figure 4:
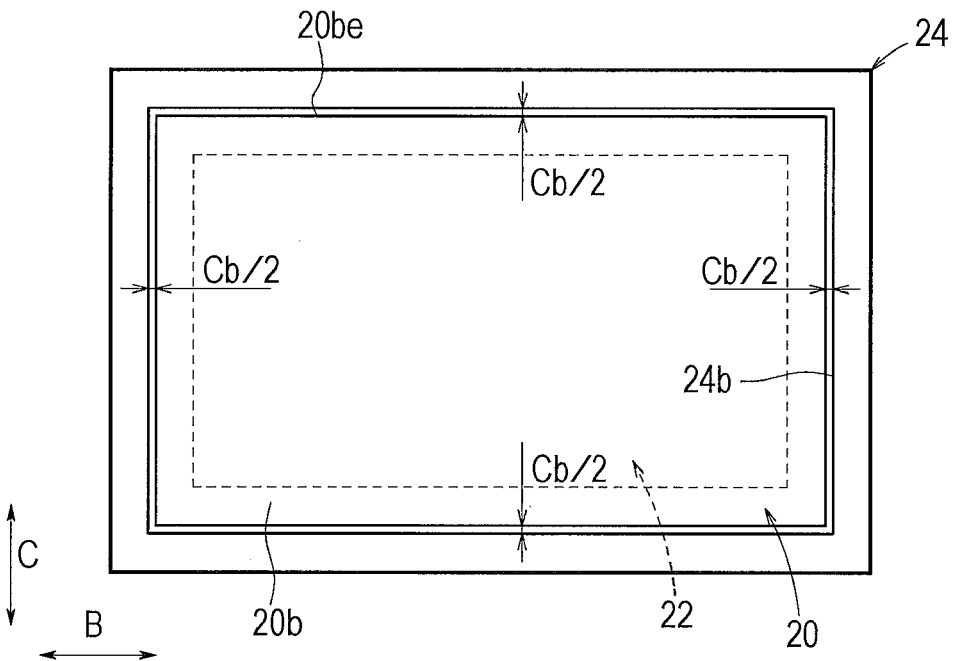
FIG. 4 is a front view of the cathode electrode of the membrane electrode assembly with a resin frame.
Figure 7:
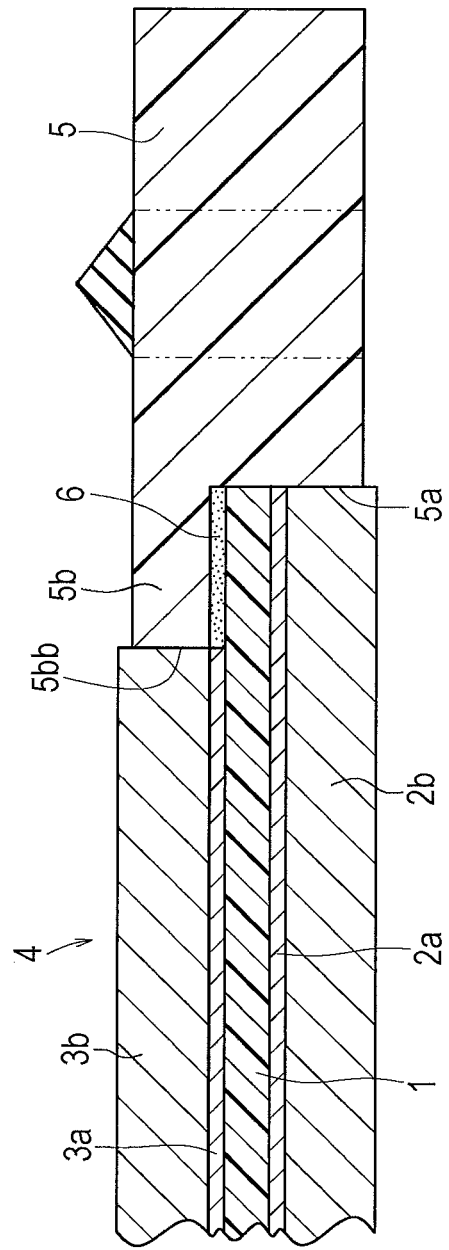
FIG. 7 illustrates the membrane electrode assembly disclosed in Japanese Unexamined Patent Application Publication No. 2007-66766.

As illustrated in FIG. 4, a second space Cb as a gap is provided between the outer peripheral end face 20be of the first gas diffusion layer 20b and the inner-side wall face 24b along the entire periphery. The difference between the dimensions of the outer peripheral end face 20be in the longer length direction and the inner-side wall face 24b in the longer length direction is the second space Cb. The difference between the dimensions of the outer peripheral end face 20be in the shorter length direction and the inner-side wall face 24b in the shorter length direction is the second space Cb. FIG. 4 illustrates an arrangement in which each side of the outer peripheral end face 20*be* is equally away from a corresponding side of the inner-side wall face 24*b* by the second space Ca/2.

The first space Ca and the second space Cb have different dimensions. In the present embodiment, the first space Ca is set to have a dimension larger than the dimension of the second space Cb (the first space Ca>the second space Cb).

As illustrated in FIG. 1, one end of the fuel cell 12 in the direction of arrow B (the horizontal direction in FIG. 1) is provided with an oxidant gas inlet communication hole 30*a* for supplying an oxidant gas, for example, an oxygen containing gas, a cooling medium inlet communication hole 32*a* for supplying a cooling medium, and a fuel gas outlet communication hole 34*b* for discharging a fuel gas, for example, a hydrogen containing gas, the communication holes 30*a*, 32*a* and 34*b* each communicating through in the direction of arrow A and being arranged in the direction of arrow C (the vertical direction).

The other end of the fuel cell 12 in the direction of arrow B is provided with a fuel gas inlet communication hole 34*a* for supplying a fuel gas, a cooling medium outlet communication hole 32*b* for discharging a cooling medium, and an oxidant gas outlet communication hole 30*b* for discharging an oxidant gas, the communication holes 34*a*, 32*b* and 30*b* each communicating through in the direction of arrow A and being arranged in the direction of arrow C.

A surface 16*a* of the second separator 16 that faces the membrane electrode assembly with a resin frame 10 is provided with oxidant gas passages 36 which communicate with the oxidant gas inlet communication hole 30*a* and the oxidant gas outlet communication hole 30*b*.

A surface 14*a* of the first separator 14 that faces the membrane electrode assembly with a resin frame 10 is provided with fuel gas passages 38 which communicate with the fuel gas inlet communication hole 34*a* and the fuel gas outlet communication hole 34*b*. Cooling medium passages 40, which communicate with the cooling medium inlet communication hole 32*a* and the cooling medium outlet communication hole 32*b*, are provided between the surface 14*b* of the first separator 14 and the surface 16*b* of the second separator 16.

As illustrated in FIGS. 1 and 2, the surfaces 14*a*, 14*b* of the first separator 14 are integrated with a first sealing member 42 which surrounds the outer peripheral end of the first separator 14. The surfaces 16*a*, 16*b* of the second separator 16 are integrated with a second sealing member 44 which surrounds the outer peripheral end of the second separator 16.

As illustrated in FIG. 2, the first sealing member 42 has a first projecting seal 42*a* which is in contact with the inner peripheral projection 24*a* of the resin frame member 24 included in the membrane electrode assembly with a resin frame 10, and a second projecting seal 42*b* which is in contact with the second sealing member 44 of the second separator 16. The second sealing member 44 forms a planar seal having a planar area which is in contact with the second projecting seal 42*b*. The second sealing member 44 may be provided with a projecting seal (not illustrated) in replace of the second projecting seal 42*b*.

The first sealing member 42 and the second sealing member 44 are formed by using a sealing member having elasticity, such as a sealing material, a cushioning material, or a packing material, for example, EPDM, NBR, a fluoride rubber, a silicone rubber, a fluoro silicone rubber, a butyl rubber, a natural rubber, a styrene rubber, a chloroprene, or an acrylic rubber.

As illustrated in FIG. 1, in the first separator 14, there are formed supply holes 46 which allow the fuel gas inlet communication hole 34*a* to communicate with the fuel gas passages 38, and discharge holes 48 which allow the fuel gas passages 38 to communicate with the fuel gas outlet communication hole 34*b*.

Next, a method of manufacturing the membrane electrode assembly with a resin frame 10 will be described in the following.

First, as illustrated in FIG. 5, the membrane electrode assembly 10*a*, which is a stepped MEA, is produced. Specifically, a binder solution is added to a mixture of catalyst and solvent, a mixed electrode ink is obtained which achieves a predetermined ink viscosity, and an electrode sheet is prepared which is obtained by applying an electrode ink to a PET sheet including a PET film. The solid polymer electrolyte membrane 18 is then sandwiched between a pair of the electrode sheets, and hot press is performed. Subsequently, the PET sheet is removed, and thus the first electrode catalyst layer 20*a* and the second electrode catalyst layer 22*a* are formed on the surface 18*a* and the surface 18*b* of the solid polymer electrolyte membrane 18, respectively.

In the process of manufacturing the first gas diffusion layer 20*b* and the second gas diffusion layer 22*b*, a slurry is formed in which a mixture containing carbon black and PTFE (polytetrafluoroethylene) particles is uniformly distributed in an ethylene glycol solution. The slurry is applied to a carbon paper and dried, thereby producing the first gas diffusion layer 20*b* and the second gas diffusion layer 22*b* including the carbon paper and the base layer.

Thus, the first gas diffusion layer 20*b* is disposed on the surface 18*a* side of the solid polymer electrolyte membrane 18, i.e., on the first electrode catalyst layer 20*a*, and the second gas diffusion layer 22*b* is disposed on the surface 18*b* side of the solid polymer electrolyte membrane 18, i.e., on the second electrode catalyst layer 22*a*. The above-mentioned layers are integrally stacked and hot press process is performed thereon, thereby producing the membrane electrode assembly 10*a*.

On the other hand, the resin frame member 24 is previously molded by performing injection molding using a metal mold (not illustrated). The resin frame member 24 has the inner peripheral projection 24*a* in a thin-wall shape, and a resin projection 28*a* for forming the resin impregnated part 28 is integrally formed on the surface of the resin frame member 24 opposite to the inner peripheral projection 24*a*, the resin projection 28*a* projecting in the width direction. The resin frame member 24 is placed on a working table (not illustrated) in a posture in which the resin projection 28*a* projects upward.

Subsequently, the adhesive layer 26 is applied to the inner peripheral projection 24*a* of the resin frame member 24, and the membrane electrode assembly 10*a* is positioned relative to the resin frame member 24. Specifically, the outer peripheral end face 20*be* of the first gas diffusion layer 20*b* included in the membrane electrode assembly 10*a* is disposed to face the inner-side wall face 24*b* of the resin frame member 24, and the outer peripheral end face 22*be* of the second gas diffusion layer 22*b* included in the membrane electrode assembly 10*a* is disposed to face the inner-side end face 24*ae* of the inner peripheral projection 24*a* included in the resin frame member 24.

In this case, in the present embodiment, at most the first space Ca is provided on one side between the outer peripheral end face 22*be* of the second gas diffusion layer 22*b* and the inner-side end face 24*ae* of the inner peripheral projection 24*a*, and at most the second space Cb is provided on one side between the outer peripheral end face 20*be* of the first gas diffusion layer 20*b* and the inner-side wall face 24*b*. The first space Ca is set to be a dimension larger than the dimension of the second space Cb (the first space Ca>the second space Cb).

Thus, as illustrated in FIG. 5, when the membrane electrode assembly 10a is mounted on the resin frame member 24, the outer peripheral end face 20be of the first gas diffusion layer 20b and the inner-side wall face 24b which have a smaller gap therebetween may be relatively positioned. In the above process, even when the end of the first gas diffusion layer 20b is approaching to the edge of the inner-side wall face 24b of the resin frame member 24, the second gas diffusion layer 22b is not placed over the inner peripheral projection 24a.

Therefore, a worker can easily continue a work of inserting the outer peripheral end face 20be of the first gas diffusion layer 20b into the inner-side wall face 24b. When the outer peripheral end face 20be of the first gas diffusion layer 20b is inserted into the inner-side wall face 24b, the outer peripheral end face 22be of the second gas diffusion layer 22b is already inserted into the inner-side end face 24ae of the inner peripheral projection 24a.

Thus, in the present embodiment, it is sufficient that the first space Ca and the second space Cb for respective gaps are set to be different dimensions. Consequently, the effect is obtained that the membrane electrode assembly 10a and the resin frame member 24 can be assembled easily and accurately.

When the thickness L2 of the step of the resin frame member 24 is formed to be thinner than the thickness L4 of the cathode electrode 20, the first space Ca can be set to have a dimension smaller than the dimension of the second space Cb (the first space Ca<the second space Cb). This is because the outer peripheral end face 22be of the second gas diffusion layer 22b is inserted into the inner-side end face 24ae of the inner peripheral projection 24a before the outer peripheral end face 20be of the first gas diffusion layer 20b is inserted into the inner-side wall face 24b.

Subsequently, the membrane electrode assembly 10a is mounted on the resin frame member 24, and then the adhesive layer 26 is heated and a load (such as pressing) is applied thereto. Thus, the inner peripheral projection 24a of the resin frame member 24, and the outer peripheral edge 18be of the solid polymer electrolyte membrane 18 are bonded together via the adhesive layer 26.

As illustrated in FIG. 6, a load is applied in a state where the membrane electrode assembly 10a and the resin frame member 24 are positioned, and the resin projection 28a of the resin frame member 24 is heated. Laser welding, infrared welding or impulse welding is used as a heating method.

Thus, the resin projection 28a is heated and molten, and the resin projection 28a is impregnated in the first gas diffusion layer 20b included in the cathode electrode 20. Finally, the membrane electrode assembly with a resin frame 10 is manufactured.

The membrane electrode assembly with a resin frame 10 is sandwiched between the first separator 14 and the second separator 16 as illustrated in FIG. 2. The first separator 14 is in contact with the inner peripheral projection 24a so as to, along with the second separator 16, apply a load to the membrane electrode assembly with a resin frame 10. In addition, a predetermined number of the fuel cells 12 are stacked to form a fuel cell stack, and a clamping load is applied between end plates which are not illustrated.

The operation of the thus configured fuel cell 12 will be described below.

First, as illustrated in FIG. 1, an oxidant gas such as an oxygen containing gas is supplied to the oxidant gas inlet communication hole 30a, and a fuel gas such as a hydrogen containing gas is supplied to the fuel gas inlet communication hole 34a. In addition, a cooling medium such as pure water, ethylene glycol or oil is supplied to the cooling medium inlet communication hole 32a.

Thus, an oxidant gas is introduced from the oxidant gas inlet communication hole 30a into the oxidant gas passages 36 of the second separator 16, flows in the direction of arrow B, and is supplied to the cathode electrode 20 of the membrane electrode assembly 10a. On the other hand, a fuel gas is introduced from the fuel gas inlet communication hole 34a into the fuel gas passages 38 of the first separator 14 through the supply holes 46. A fuel gas flows in the direction of arrow B along the fuel gas passages 38, and is supplied to the anode electrode 22 of the membrane electrode assembly 10a.

Thus, in the membrane electrode assembly 10a, the oxidant gas supplied to the cathode electrode 20 and the fuel gas supplied to the anode electrode 22 are consumed by an electrochemical reaction in the first electrode catalyst layer 20a and the second electrode catalyst layer 22a, and thus power is generated.

Subsequently, the oxidant gas that has been supplied to the cathode electrode 20 and consumed is discharged along the oxidant gas outlet communication hole 30b in the direction of arrow A. Similarly, the fuel gas that has been supplied to the anode electrode 22 and consumed is discharged along the fuel gas outlet communication hole 34b through the discharge holes 48 in the direction of arrow A.

The cooling medium supplied to the cooling medium inlet communication hole 32a is introduced into the cooling medium passages 40 between the first separator 14 and the second separator 16, and then flows in the direction of arrow B. The cooling medium cools the membrane electrode assembly 10a, and then is discharged from the cooling medium outlet communication hole 32b.

In the present embodiment, the resin impregnated part 28 includes the resin projection 28a which is integrally molded with the resin frame member 24, however, the configuration is not limited to this. For example, a resin member separate from the resin frame member 24 is prepared, and the resin impregnated part 28 may be formed by melting the resin member on the resin frame member 24 and the first gas diffusion layer 20b.

According to the embodiment, a membrane electrode assembly with a resin frame for a fuel cell, includes: a membrane electrode assembly in which a first electrode having a first catalyst layer and a first gas diffusion layer is disposed on one surface of a solid polymer electrolyte membrane, a second electrode having a second catalyst layer and a second gas diffusion layer is disposed on the other surface of the solid polymer electrolyte membrane, and a planar dimension of the first gas diffusion layer is set to a dimension larger than a planar dimension of the second gas diffusion layer; and a resin frame member having a frame shape which surrounds an outer periphery of the solid polymer electrolyte membrane, the resin frame member including an inner peripheral projection which is formed to be thinner than an outer peripheral portion via a step and projecting in a direction to the second gas diffusion layer, and an inner-side wall face which constitutes the step and faces an outer peripheral end face of the first gas diffusion layer. In the membrane electrode assembly with a resin frame for a fuel cell, a first space is set to have a dimension different from the dimension of a second space, the first space being a gap between an outer peripheral end face of the second gas diffusion layer and an inner-side end face of the inner peripheral projection, the second space being a gap between the outer peripheral end face of the first gas diffusion layer and the inner-side wall face.

preferably, the first space is set to have a dimension larger than the dimension of the second space in the membrane electrode assembly with a resin frame for a fuel cell.

Preferably, a thickness of the step is set to the total thickness of the thickness of the solid polymer electrolyte membrane and the thickness of the first electrode in the membrane electrode assembly with a resin frame for a fuel cell.

According to the embodiment, a membrane electrode assembly (stepped MEA) and a resin frame member can be assembled by performing positioning with respect to the gap between the outer peripheral end face of the second gas diffusion layer and the inner-side end face of an inner peripheral projection, or the gap between the outer peripheral end face of the first gas diffusion layer and the inner-side wall face. That is to say, by only performing positioning with respect to a smaller gap, the other positioning with respect to a larger gap can be automatically performed according to the previous positioning.

Thus, it is sufficient that the first space and the second space for respective gaps are set to be different dimensions, and thus a membrane electrode assembly (stepped MEA) and a resin frame member can be easily and accurately assembled in a simple and cost-effective manner.

Obviously, numerous modifications and variations of the present invention are possible in light of the above teachings. It is therefore to be understood that within the scope of the appended claims, the invention may be practiced otherwise than as specifically described herein.

What is claimed is:

1. A membrane electrode assembly for a fuel cell, comprising:
    a membrane electrode assembly comprising:
        a solid polymer electrolyte membrane;
        a first electrode disposed on one surface of the solid polymer electrolyte membrane and including a first catalyst layer and a first gas diffusion layer; and
        a second electrode disposed on another surface of the solid polymer electrolyte membrane and including a second catalyst layer and a second gas diffusion layer, a planar dimension of the first gas diffusion layer being larger than a planar dimension of the second gas diffusion layer; and
    a resin frame member to surround an outer periphery of the solid polymer electrolyte membrane, the resin frame member comprising:
        an outer peripheral portion; and
        an inner peripheral projection which is thinner than the outer peripheral portion and projects toward the second gas diffusion layer from the outer peripheral portion, a step being defined by the outer peripheral portion and the inner peripheral projection, the outer peripheral portion including an inner-side wall face which is included in the step and faces an outer peripheral end face of the first gas diffusion layer, a first space comprising a gap between an outer peripheral end face of the second gas diffusion layer and an inner-side end face of the inner peripheral projection, a second space comprising a gap between the outer peripheral end face of the first gas diffusion layer and the inner-side wall face, the first space having a dimension different from a dimension of the second space.

2. The membrane electrode assembly for a fuel cell according to claim 1,
    wherein the first space has a dimension larger than a dimension of the second space.

3. The membrane electrode assembly for a fuel cell according to claim 2,
    wherein a thickness of the step is equal to a total thickness of the solid polymer electrolyte membrane and the first electrode.

4. The membrane electrode assembly for a fuel cell according to claim 1,
    wherein a thickness of the inner peripheral projection is equal to or less than a thickness of the second electrode.

5. The membrane electrode assembly for a fuel cell according to claim 1,
    wherein a total thickness of the solid polymer electrolyte membrane and the first electrode is greater than or equal to a thickness obtained by subtracting a thickness of the inner peripheral projection from a thickness of the resin frame member.

* * * * *